Dec. 14, 1943.   W. A. RINGLER   2,336,503
SLIDING CLOSURE FOR BELLOWS OR GABLE TOP BOXES
Filed Feb. 7, 1942   3 Sheets-Sheet 1
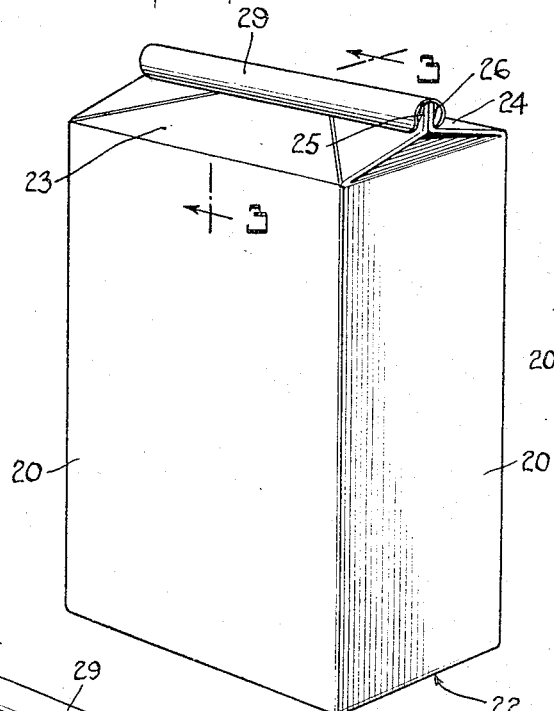
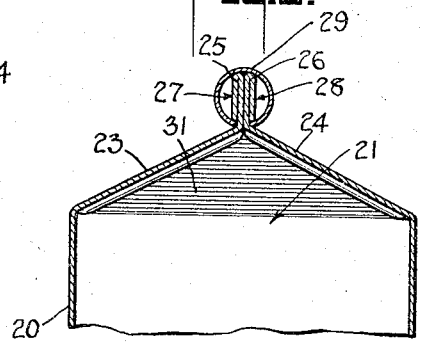
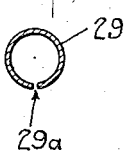
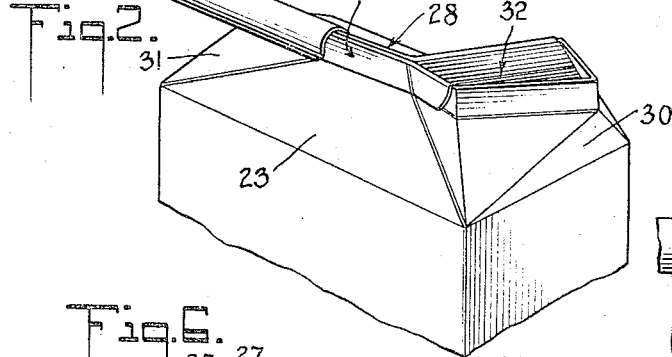
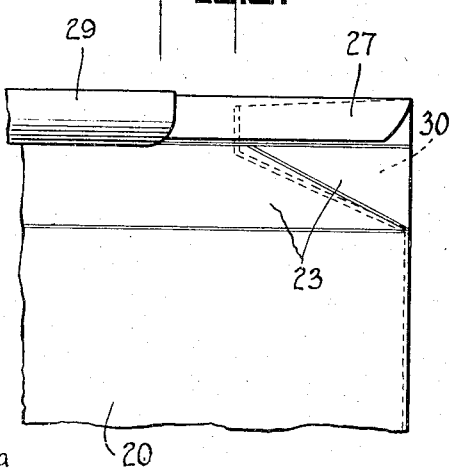
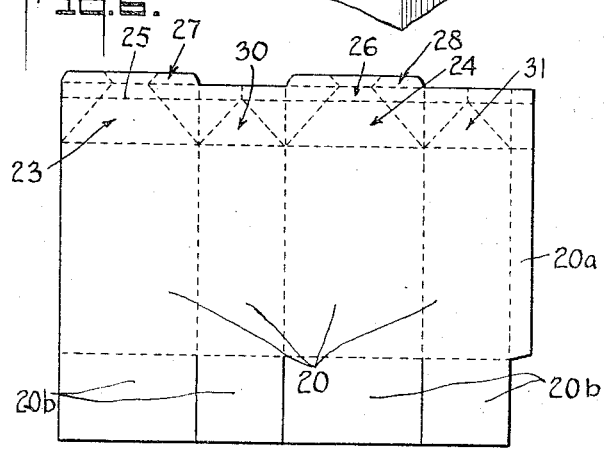
INVENTOR
William A. Ringler
HIS ATTORNEY Dec. 14, 1943.  W. A. RINGLER  2,336,503
SLIDING CLOSURE FOR BELLOWS OR GABLE TOP BOXES
Filed Feb. 7, 1942   3 Sheets-Sheet 2
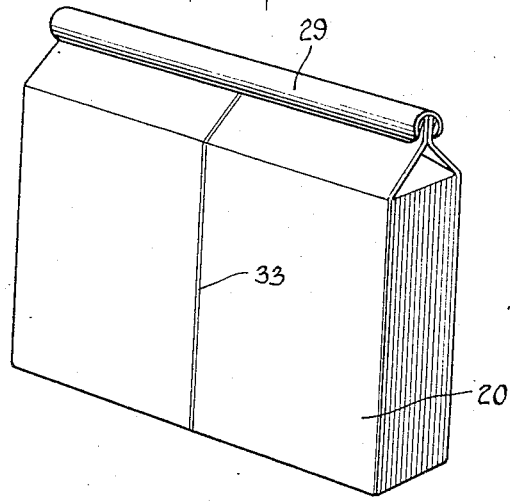
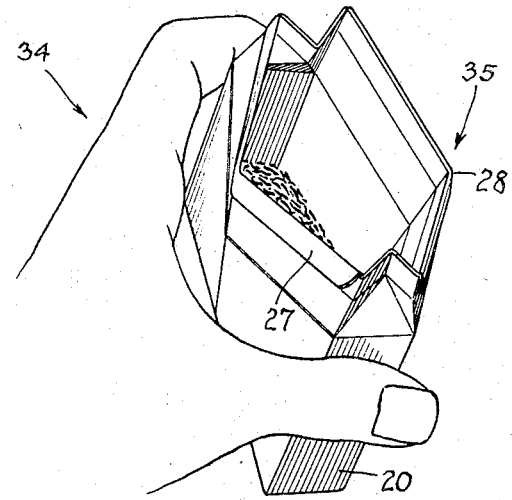
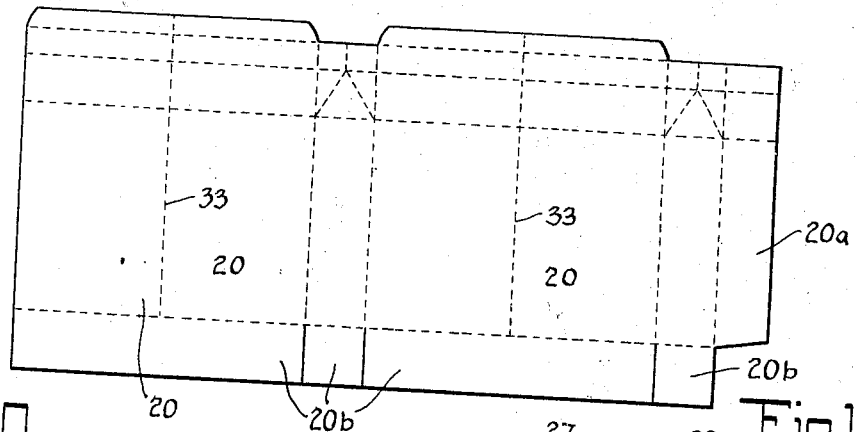
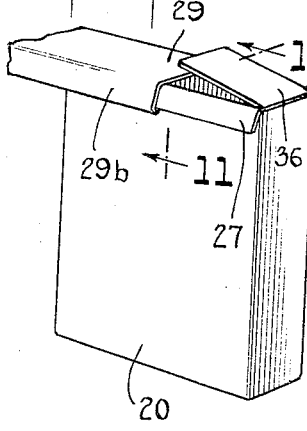
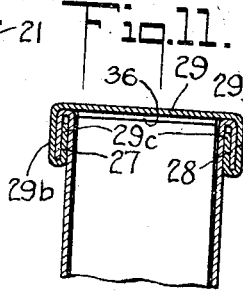
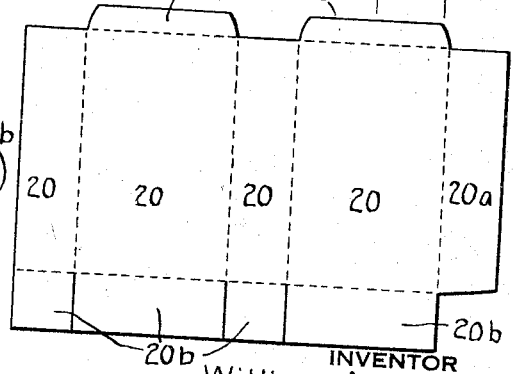
INVENTOR
William A. Ringler
ATTORNEY Dec. 14, 1943.  W. A. RINGLER  2,336,503
SLIDING CLOSURE FOR BELLOWS OR GABLE TOP BOXES
Filed Feb. 7, 1942  3 Sheets-Sheet 3
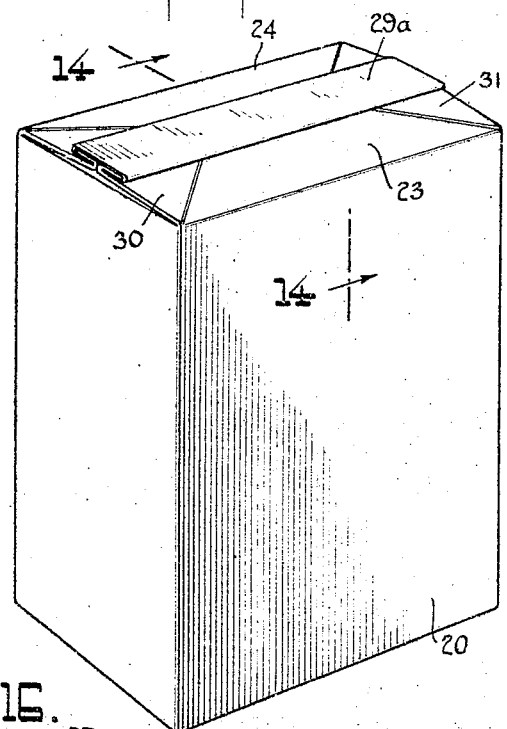
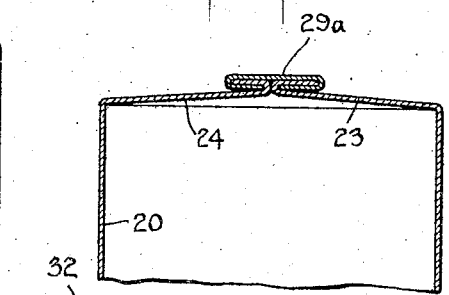
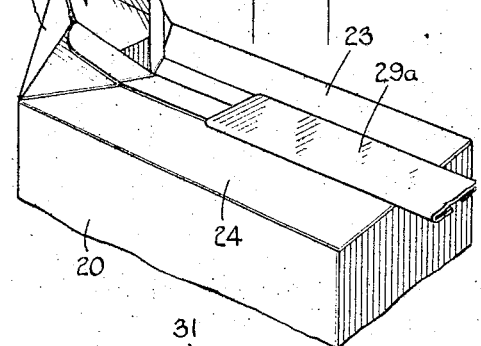
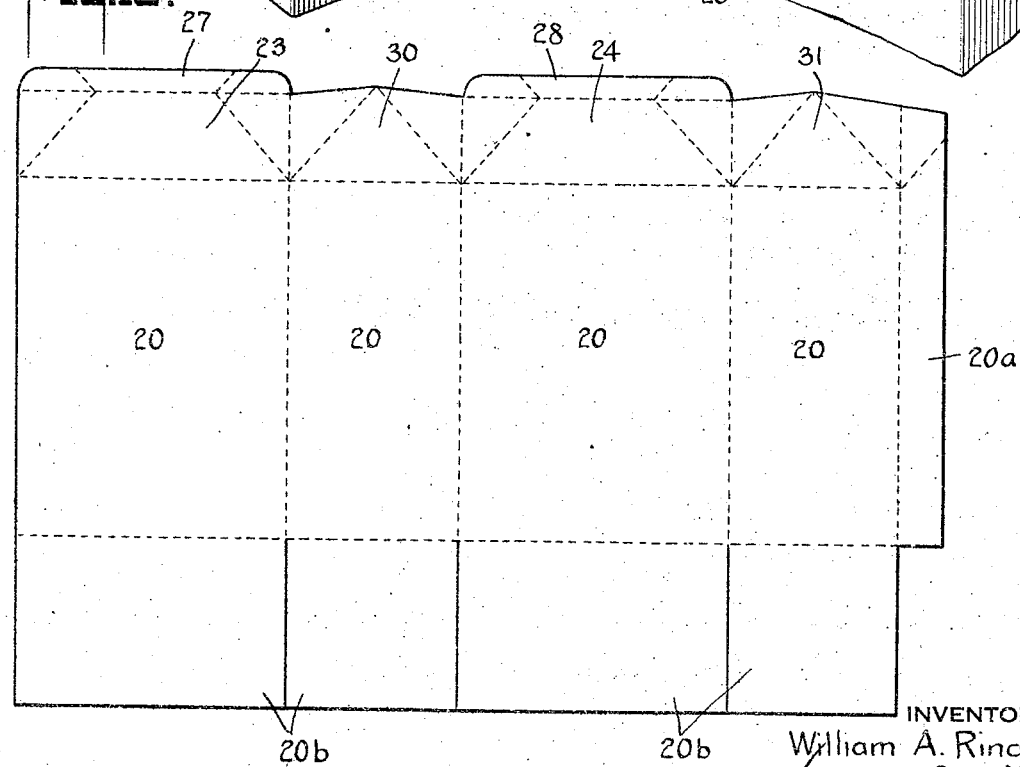
INVENTOR
William A. Ringler
BY
Henry J. Lucke
HIS ATTORNEY Patented Dec. 14, 1943

2,336,503

UNITED STATES PATENT OFFICE 2,336,503

SLIDING CLOSURE FOR BELLOWS OR GABLE TOP BOXES

William A. Ringler, Wayne, Pa., assignor to National Folding Box Company, New Haven, Conn., a corporation of New Jersey Application February 7, 1942, Serial No. 429,847

4 Claims. (Cl. 229—65)

The invention relates to slide-closed cartons or containers.

More particularly the invention relates to cartons or containers comprising a body part of relatively stiff sheet material such as cardboard or other suitable paper stock or the like, the body part having a dispensing opening, sheet material secured to the material of the body part projecting beyond the dispensing opening to form closure panels and including oppositely related terminal portions and a closure slotted member of resilient rigid material arranged to encompass the stated oppositely related terminal portions to thereby retain the closure panels in closing position, the stated oppositely related terminal portions serving as guide rail elements for the closure member of resilient rigid material.

Preferably, the closure panels are integral with the relatively stiff sheet material of the body part, and preferably also crease lines are formed in the closure panels to afford relative displacement for effecting dispensing of the contents of the body part upon partial withdrawal of the closure member.

In the more preferred types of cartons or containers embodying the invention, the closure panels are arranged to have end portions which when in closing position are brought into side-by-side relation with their terminal rail elements extending substantially parallel to one another. In such more preferred types the closure member of resilient rigid material is preferably arranged to form a pressure sealing slide joint with the terminal rail elements.

Certain embodiments of the invention comprise a body part of sheet material and provided with a dispensing opening and closure means for closing the dispensing opening of the body part, such closure means comprising sheet material secured to, and preferably integral with, the material of the body part adjacent the periphery of the dispensing opening of the body part and having terminal portions of predetermined equal length and having free edges and arranged substantially parallel to one another and serving as rail elements and a closure member of resilient rigid material arranged to encompass said rail elements and retained and slidingly guided under friction by the free edges of said rail elements.

In the accompanying drawings:

Fig. 1 is a perspective side view of one preferred construction of a carton or container embodying the invention, showing the dispensing opening closed by the closure panels and slotted closure member.

Fig. 2 is a perspective detail top view of the upper portion of the carton or container of Fig. 1, showing the slotted closure member partially displaced to afford displacement of certain of the closure panels to pouring-spout position.

Fig. 3 is a detail sectional view on line 3—3 of Fig. 1.

Fig. 4 is a transverse sectional view of the slotted closure member and a detail sectional view on line 4—4 of Fig. 22.

Fig. 5 is a detail side elevation corresponding to Fig. 2 but showing the pouring-spout affording panels in closed position.

Fig. 6 is a plan view of a blank applicable for forming the carton or container shown in Figs. 1, 2, 3 and 5 and the closure panels of integral construction.

Fig. 7 is a perspective side view of another embodiment of the invention, showing the slotted closure member and closure panels in fully closed position.

Fig. 8 is a perspective view of the embodiment of Fig. 7, showing the slotted closure member wholly removed and illustrating the expansion of the dispensing opening, under manually applied pressure indicated diagrammatically, such expansion being afforded by suitable crease lines in the material of the body part and pertinent closure panels.

Fig. 9 is a blank illustrating one manner of forming the body part and closure panels of Figs. 7 and 8 of integral construction.

Fig. 10 is a perspective side view of another embodiment of the invention.

Fig. 11 is a detail sectional view on line 11—11 of Fig. 10.

Fig. 12 is a plan view of the blank of the body part of the carton or container shown in Figs. 10 and 11.

Fig. 13 is a perspective side elevation of another embodiment of the invention, illustrating the closure panels and the slotted closure member in fully closed position; Fig. 14 is a detail section view of Fig. 13, taken on line 14—14; Fig. 15 is a detail perspective top view of Fig. 14, illustrating the slotted closure member partially displaced to afford displacement of certain of the closure panels to pouring-spout position. Fig. 16 is a plan view of a blank for forming the carton or container shown in Figs. 13, 14 and 15 and the closure panels of integral construction.

Referring to Figs. 1 through 5, the body part 20 may be of any desired polygonal or other configuration. The body part is provided at its top with a dispensing opening indicated generally 21, see Fig. 3. The body part may be formed of suitable sheet material and preferably to be foldable in knock-down status. The bottom 22 of the body part may be closable pursuant to conventional practice.

Adjacent the dispensing opening 21, and preferably integral with the material of the body part are provided closure panels including the oppositely related panels 23, 24 which have free end portions 25, 26, arranged when in closed position to be brought into side-by-side relation and are formed to provide mutually parallelly extending elements 27, 28 which serve as rail elements for receiving the slotted closure member 29 and upon movement of the slotted closure member 29 to guide the same.

Desirably, such closure panels extend peripherally wholly about the walls of the dispensing opening 21 of the body part 20; preferably, such closure panels are integral with the material of the body part.

In the embodiment of Figs. 1, 2, 3 and 5, there are provided panels 30, 31 oppositely related and preferably integrally related with respect to the said closure panels 23, 24, whereby upon setting-up the body part 20, the closure panels 23, 31, 24, 30, in the order named, project completely about the dispensing opening 21 of the body part.

Figs. 1, 2, 3 and 5 illustrate also the preferred arrangement of the closure panels 23, 24, 30, 31 to provide a pouring-spout formation, see 32, Fig. 2, upon partial withdrawal of the closure member 29. Specifically such pouring-spout formation may be had by suitable crease lines and desirably with respect to both end closure panels 30 and 31 cooperatively with the closure panels 23, 24.

Upon dispensing a portion or the whole of the contents of the carton or container, the parts of the pouring-spout formation are merely moved toward one another, as indicated in Fig. 5, whereupon the slotted closure member 29 may be returned to full closing position.

At full closing position of the closure means the contents of the carton or container are safeguarded against sifting, loss or aroma and/or flavor-imparting constituents and exteriorly against dust or other foreign substances.

The blank illustrated in Fig. 6 typifies the formation of the body part 20 and closure panels 23, 24, and their terminal portions 25, 26 and rail elements 27, 28, as well as the oppositely related end closure panels 30, 31, of integral sheet material.

Preferably, the slotted closure member 29 is formed of resilient stiff material and dimensioned with respect to the rail elements 27, 28 to dually lock the closure panels in closed position, and seal all joints concerned.

As illustrated in the carton or container shown in Figures 1 through 5, the slotted closure member 29 is of circular formation, its slot being indicated at 29a. A convenient manner of forming the closure member 29 is to initially form a circular tube of the resilient rigid material of the required length and then slit the tube for its full length. The inner diameter of the length of tube and the width of the slot 20a are selected relative to the vertical dimension of the rail elements 27, 28 to provide when the edges of the slot 29a are respectively formed to engage the under, i. e., free edges of the rail elements 27, 28, that the upper rounded edges of the rail elements 27, 28 engage under pressure the upper facial area of the inner face of the closure member 29 with sufficient pressure to force the contiguous faces of the end portions 25, 26 of the closure panels toward and against one another to thereby close the closure panels under sealing pressure.

The closure member 29 may be formed of relatively heavy paper stock, usually resiliently stiffened, or of metal of suitable resiliency and rigidity.

Fig. 6 illustrates a blank from which the body part 20 and closure panels 23, 24, 30, 31 may be formed of integral material. The panels of the blank shown in Fig. 6 corresponding to the parts of the carton or container referred to above bear corresponding reference characters. The score lines defining the panels constituting the lateral sides and bottom of the body part 20 are indicated by dash lines. The dash lines appearing within the contours of the closure panels 23, 24, 30, 31 indicate the crease lines providing the spout-formation at the opposing sides of the dispensing opening 21. The flap 20a, shown in Fig. 6, provides a glue area for forming the hollow configuration of the body part 20. The panels 20b are the bottom closing panels.

The embodiment shown in Figs. 7, 8 and 9 corresponds generally to that illustrated in Figs. 1, 2, 3 and 5 and corresponding parts are designated by corresponding reference characters. A particular feature of the embodiment shown in Figs. 7, 8 and 9 is the provision of the crease lines 33, 33, formed in oppositely lying panels of the body part 20 affording, when the closure member 29 has been fully withdrawn from the rail elements 27, 28, the relative displacement of the walls defining the dispensing opening of the body part, as by pressure applied manually, indicated at 34, see Fig. 8, to produce a pouring spout formation indicated at 35, to facilitate dispensing of the contents.

The embodiment shown in Figs. 7 and 8 is particularly adapted for the packaging of smoking tobacco or material of like relatively finely divided character. More frequently material of such character is dispensed from stage to stage and it is desirable, as is afforded upon re-closure of the illustrated embodiment, that the retained contents be protected against loss of aroma and flavor-imparting constituents, as well as against entry of air, moisture, dirt or other foreign substances.

The embodiment shown in Figs. 10 and 11 comprises generally, as above set out, a body part 20 having a dispensing opening 21, and provided at oppositely related edges of its opening 21 with rail elements 27, 28 of predetermined equal length and substantially parallel to one another for receiving and guiding the slotted closure member 29. In this type of the invention, the slotted closure member 29 is formed of resilient rigid material having oppositely related substantially parallel, edge-provided terminal portions 29b, 29b, adapted to be engaged under pressure and guided by the free edges of the rail elements 27, 28. The length of the closure member 29 is substantially equal to or slightly exceeds the longitudinal dimension of the rail elements 27, 28.

As appears from Fig. 10, the slotted closure member 29 may be partially withdrawn to afford partial opening of the dispensing opening 21 of the body part 20.

To enhance the closure between the body part 20 and the closure member 29 when the latter is in fully closed position, there is provided the closure panels 26, see Figs. 10 and 11, for the respective ends of the dispensing opening 21. Such closure panels 36 may be suitably secured to the material of the body part at or adjacent the periphery of the dispensing opening 21 at the concerned ends thereof, or such closure panels 36 may be provided in the form of a strip of sheet material of general U-shape extending interiorly of the body part closely adjacent to and about the pertinent oppositely related walls and the bottom of the body part, in which latter instance the closure panels 36 may be employed additionally as a finger piece for facilitating the dispensing of the contained articles of the nature of cigarettes, candy sticks, crayons or other pencils, etc.

Preferably, such substantially parallel edge-provided terminal portions 29b, 29b, have at their lower edges upwardly projecting extensions 29c, 29c, for engaging the respective inner faces of the rail elements 27, 28 to thereby increase the rigidity of the material of the body part adjacent its dispensing opening, operative at the stage of full closing as well as upon partial withdrawal of the closure member 29, and also for increasing the frictional engagement of the closure member 29 with the respective rail elements 27, 28, to thereby secure the retention of the closure member 29 under partial withdrawal.

In the preferred embodiments shown in Figs. 10 and 11, the closure member is accurately dimensioned with respect to the dimensions of the dispensing opening 21 whereby the closure member when in closed position or approximately closed position maintains the walls of the dispensing opening in true rectangular formation and is in frictional engagement with all walls of the dispensing opening. The attainment of this function is enhanced by the upwardly projecting extensions 29c, 29c of the closure member 29. Also, in such preferred embodiments shown in Figs. 10 and 11, the closure flaps 36 are dimensioned to frictionally engage the inner face of the walls of the dispensing opening 21 at which the rail elements 27, 28 extend, to preclude bulging of the walls of the dispensing opening, when the closure member 29 is partially withdrawn from closed position, as well as cooperate with the closure member 29 when in fully closed position to effectively close the dispensing opening.

The embodiment shown in Figs. 13, 14 and 15 follows generally that of Figs. 1 through 5, inclusive, and like parts are designated by like reference characters. The embodiment typified by Figs. 13, 14 and 15 particularizes the features that the end panels 23, 24, 30 and 31 assume a relatively low gable formation when in mutually closed position; that the rail elements 27, 28 extend in opposing horizontal directions when the end panels are in closed relationship; and that slotted closure member 29a is of flat contour and configurated to slidingly engage the horizontal rail elements 27, 28 under frictional pressure to hold the closure panels in mutually sealed engagement, similarly as in the aforesaid constructions.

Preferably, the body and end panels of the embodiment of Figs. 13, 14 and 15 are formed of an integral blank, as indicated in Fig. 16. Fig. 16 illustrates also the provision of a pouring spout formation, see 32 in Fig. 15, afforded by angularly related crease lines formed in the respective lateral end panels 30, 31, and cooperatively in the associated end panels 23, 24, effective upon partial displacement of the sliding closure member 29a. These crease lines are shown by the indicated angularly related dotted lines appearing in the end panels 30, 31, 23 and 24.

From the above it appears that each of the several embodiments of my invention includes a body part provided with a dispensing opening defined by relatively stiff sheet material, that portion of the relatively stiff sheet material which is disposed at the edges of the dispensing opening being folded freely outwardly and downwardly upon itself to form rail elements, the terminal edges of which extend substantially parallel to the edges of the dispensing opening; that a closure element is provided for the dispensing opening, it comprising a member of relatively stiff resilient material bent inwardly and upwardly of itself—for example, a slitted tube of circular or substantially circular formation, as shown in Figs. 1 through 7, or a channel piece provided with inwardly and upwardly extending terminal portions, as shown in Figs. 10 and 11, or a relatively flat slide, as shown in Figs. 13, 14 and 15—to provide rail riding elements having mutually parallel edges; and that the effective vertical dimension of each rail-riding element of the closure is less than the vertical dimension of its corresponding rail element, to thereby tension such relatively stiff resilient closure member in any of its closing positions relative to the dispensing opening.

Whereas I have described my invention by reference to specific forms thereof, it will be understood that many changes and modifications may be made without departing from the spirit of the invention.

I claim:

1. A carton or container comprising a body part provided with a dispensing opening defined by relatively stiff sheet material, said relatively stiff sheet material at the edges of the dispensing opening being folded freely outwardly and downwardly upon itself to form rail elements, the terminal edges of which extend substantially parallel to the edges of the dispensing opening, and closure means for the dispensing opening including a member of relatively stiff resilient material bent inwardly and upwardly of itself to provide oppositely disposed terminal portions serving as rail-riding elements having mutually parallel edges, the effective vertical dimension of said rail-riding elements being less than the vertical dimension of said rail elements to thereby tension said relatively stiff resilient member when the closure means is in closing position relative to the dispensing opening.

2. A carton or container comprising a body part provided with a dispensing opening defined by relatively stiff sheet material, said relatively stiff sheet material at the edges of the dispensing opening being folded freely outwardly and downwardly upon itself to form rail elements, the terminal edges of which extend substantially parallel to the edges of the dispensing opening, and closure means for the dispensing opening including an arcuately shaped member of relatively stiff resilient material bent inwardly and upwardly of itself to provide oppositely disposed terminal portions serving as rail-riding elements having mutually parallel edges, the effective vertical dimension of said rail-riding elements being less than the vertical dimension of said rail elements to thereby tension said relatively stiff resilient member when the closure means is in closing position relative to the dispensing opening.

3. A carton or container comprising a body part provided with a dispensing opening defined by relatively stiff sheet material, said relatively stiff sheet material at the edges of the dispensing opening being folded freely outwardly and downwardly upon itself to form rail elements, the terminal edges of which extend substantially parallel to the edges of the dispensing opening, said dispensing opening being defined by relatively stiff sheet material comprising panels arranged to mutually converge toward one another when the dispensing opening is in its minimum opening status, and closure means for the dispensing opening including an arcuately shaped member of relatively stiff resilient material bent inwardly and upwardly of itself to provide oppositely disposed terminal portion serving as rail-riding elements having mutually parallel edges, the effective vertical dimension of said rail-riding elements being less than the vertical dimension of said rail elements to thereby tension said relatively stiff resilient member when the closure means is in closing position relative to the dispensing opening.

4. A carton or container comprising a body part provided with a dispensing opening defined by relatively stiff sheet material, said relatively stiff sheet material at the edges of the dispensing opening being folded freely outwardly and downwardly upon itself to form rail elements, the terminal edges of which extend substantially parallel to the edges of the dispensing opening, said dispensing opening being defined by relatively stiff sheet material comprising panels arranged to mutually converge toward one another when the dispensing opening is in its minimum opening status, certain of said panels being scored to provide a pouring spout, and closure means for the dispensing opening including an arcuately shaped member of relatively stiff resilient material bent inwardly and upwardly of itself to provide oppositely disposed terminal portions serving as rail-riding elements having mutually parallel edges, the effective vertical dimension of said rail-riding elements being less than the vertical dimension of said rail elements to thereby tension said relatively stiff resilient member when the closure means is in closing position relative to the dispensing opening.

WILLIAM A. RINGLER.